United States Patent [19]
Marland et al.

[11] Patent Number: 5,185,793
[45] Date of Patent: Feb. 9, 1993

[54] METHOD AND APPARATUS FOR SECURING TELEVISION SIGNALS USING SIDEBAND INTERDICTION

[75] Inventors: Dale W. Marland, Erieville, N.Y.; Ted Hartson, Scottsdale, Ariz.

[73] Assignee: Eagle Comtronics, Inc., Clay, N.Y.

[21] Appl. No.: 670,193

[22] Filed: Mar. 15, 1991

[51] Int. Cl.⁵ .......................................... H04N 7/167
[52] U.S. Cl. ........................................................ 380/5
[58] Field of Search ............................................. 380/5

[56] References Cited
U.S. PATENT DOCUMENTS 4,074,311 2/1978 Tanner et al.
4,099,203 7/1978 Garodnick et al.
4,222,067 9/1980 Stern et al.
5,022,078 6/1991 Zelenz.

Primary Examiner—Thomas H. Tarcza
Assistant Examiner—David Cain
Attorney, Agent, or Firm—Parkhurst, Wendel & Rossi

[57] ABSTRACT

A method and apparatus for securing a television transmission signal from unauthorized reception is disclosed that employs a sideband interdiction technique. A portion of the signal's sideband content is enhanced such that the signal is rendered useless for reception. The signal is decoded by passing the signal through a passive all-pass delay-equalizer network at the site of the receiver.

22 Claims, 8 Drawing Sheets

METHOD AND APPARATUS FOR SECURING TELEVISION SIGNALS USING SIDEBAND INTERDICTION

FIELD OF THE INVENTION

The invention relates in general to methods and systems for securing or scrambling a television transmission signal in order to prevent unauthorized reception of the signal. More specifically, the invention provides a method and apparatus for securing a television transmission signal from unauthorized reception by employing a sideband interdiction technique in which a portion of the signal's sideband content is enhanced, such that the signal is rendered unintelligible unless it is passed through a passive all-pass delay-equalizer network at the site of the receiver.

BACKGROUND

It has long been a customary practice for subscription television communication systems—a system in which the reception of a television program signal, generally recoverable by a group of television receivers, is limited to specifically authorized receivers—to scramble or encode their television transmission signals to prevent unauthorized reception by individuals that have not paid a subscription fee. Conventional hard-wired community antenna television systems (CATV), for example, are representative of a typical subscription television communication system, although other systems have been developed that employ radio frequency (RF) transmission to subscribers instead of hard-wiring. If the subscription television system provides more than one channel, it is also desirable to provide selected scrambling or securing of individual channels that are used to provide premium services.

While various methods have been suggested for scrambling a television transmission signal, one of the methods most commonly employed is to add a scrambling signal or interfering carrier signal to the television transmission signal between its aural and visual carriers. The scrambling signal is added to the television transmission signal to provide additional information which causes a television receiver to reconstitute the scrambled television transmission signal in an incoherent form. The scrambling signal is removed by passing the scrambled television transmission signal through a high-Q notch filter at the site of an authorized television receiver. In practice, an individual can obtain the high-Q notch filter by paying the required subscription fee.

There are inherent disadvantages to utilizing a notch filter or band elimination filter to remove the scrambling signal from the scrambled television transmission signal as described above. For example, a portion of the information content of the original television transmission signal, i.e. the signal prior to scrambling, is removed along with the scrambling signal causing signal degradation. Some of the degradation can be counterbalanced by utilizing a pre-emphasizing amplifier to symmetrically amplify a band around the scrambled signal as described in U.S. Pat. No. 4,074,311, but pre-emphasizing will not totally compensate for the degradation. In addition, it is difficult to provide a very narrow band filter at higher channel frequencies. Thus, degradation of the received television signal is more severe when securing higher frequency television channels.

It is an object of the present invention to provide a method and apparatus for securing a television transmission signal from unauthorized reception without requiring the use of a band-elimination filter at the site of an authorized receiver station. If the use of a band-elimination filter is avoided, the entire information content of the television signal can be provided to an authorized receiver, thereby avoiding the signal degradation problems associated with other conventional television security systems.

SUMMARY OF THE INVENTION

In contrast to conventional systems that add a scrambling signal which must subsequently be removed by a band-elimination filter, the present invention employs a sideband interdiction technique which enhances a portion of a television transmission signal's sideband content such that the visual and audio components of the signal are rendered unintelligible, i.e. unable to be visually or audibly recognized, when received by an unauthorized television receiver. The received signal can be rendered recognizable, however, by passing the signal through a passive all-pass delay-equalizer network at the site of the authorized receiver.

More specifically, in a preferred embodiment of the invention, a splitting unit is provided for splitting an intermediate frequency (IF) signal, generated by a transmitter site's modulator in response to an original video input signal, into first and second identical phase signals. A sideband enhancement unit processes the first signal and generates a sideband enhancement characteristic signal. A compensation unit processes the second signal in order to provide phase and amplitude compensation shifts in the second signal that correspond to phase and amplitude shifts that occur in the first signal during the processing of the first signal by the sideband enhancement unit. A combining unit then combines the sideband enhancement characteristic signal generated by the sideband enhancement unit with the second signal after the second signal has been processed by the compensation unit to form an encoded IF signal. The encoded IF signal is further processed in a conventional manner to generate an RF encoded television transmission signal.

The sideband enhancement characteristic signal incorporated in the encoded IF signal causes amplitude and phase shifts in the sideband characteristics of the encoded television transmission signal which render the encoded television transmission signal unintelligible when received by an unauthorized receiver. A decoding unit is provided at authorized subscriber receivers to decode the encoded television transmission signal and render it intelligible, i.e., visually and audibly recognizable. The decoding unit counteracts the amplitude enhancement and phase shifts in the sideband content of the encoded television transmission signal caused by the sideband enhancement characteristic signal, thereby returning the sideband content of the encoded television transmission signal to normal levels associated with the original video input signal to be transmitted. Signal degradation is avoided as the entire bandwidth information content of the original video input signal applied to the transmitter site's modulator is received by the authorized receiver.

BRIEF DESCRIPTION OF THE DRAWINGS

With the above as background, reference should now be made to the following detailed description of the preferred embodiment of the invention and the accompanying drawings, wherein.

DETAILED DESCRIPTION OF THE PREFERRED EMBODIMENTS

The present invention is based on the utilization of a sideband interdiction technique which enhances a portion of a television transmission signal's sideband content such that the signal is rendered unintelligible when received by an unauthorized television receiver. The television transmission signal is rendered intelligible by passing the signal through a passive all-pass delay-equalizer network that counteracts and removes the enhanced sideband content at the site of an authorized receiver. The signal degradation associated with conventional television security systems that employ band-elimination filters at the receiver is avoided, as the entire information content of the original signal to be transmitted is received by the authorized receiver.

Implementation of the sideband interdiction technique is accomplished by placing a sideband interdiction system (SIS) headend encoder into the intermediate frequency (IF) loop of a transmission site's modulator. The SIS headend encoder enhances a narrow portion of the sideband content of the channel to be secured. The enhanced sideband interferes with the visual and aural carrier signals of the secured channel and renders the channel useless for normal visual and audio reception. A passive all-pass delay-equalizer network, corresponding to the secured channel, is provided at each authorized receiver to remove the effects of the enhanced sideband. In multichannel systems, a separate passive all-pass delay equalizer network is provided at the authorized receiver for each secured channel.

Figure 1:
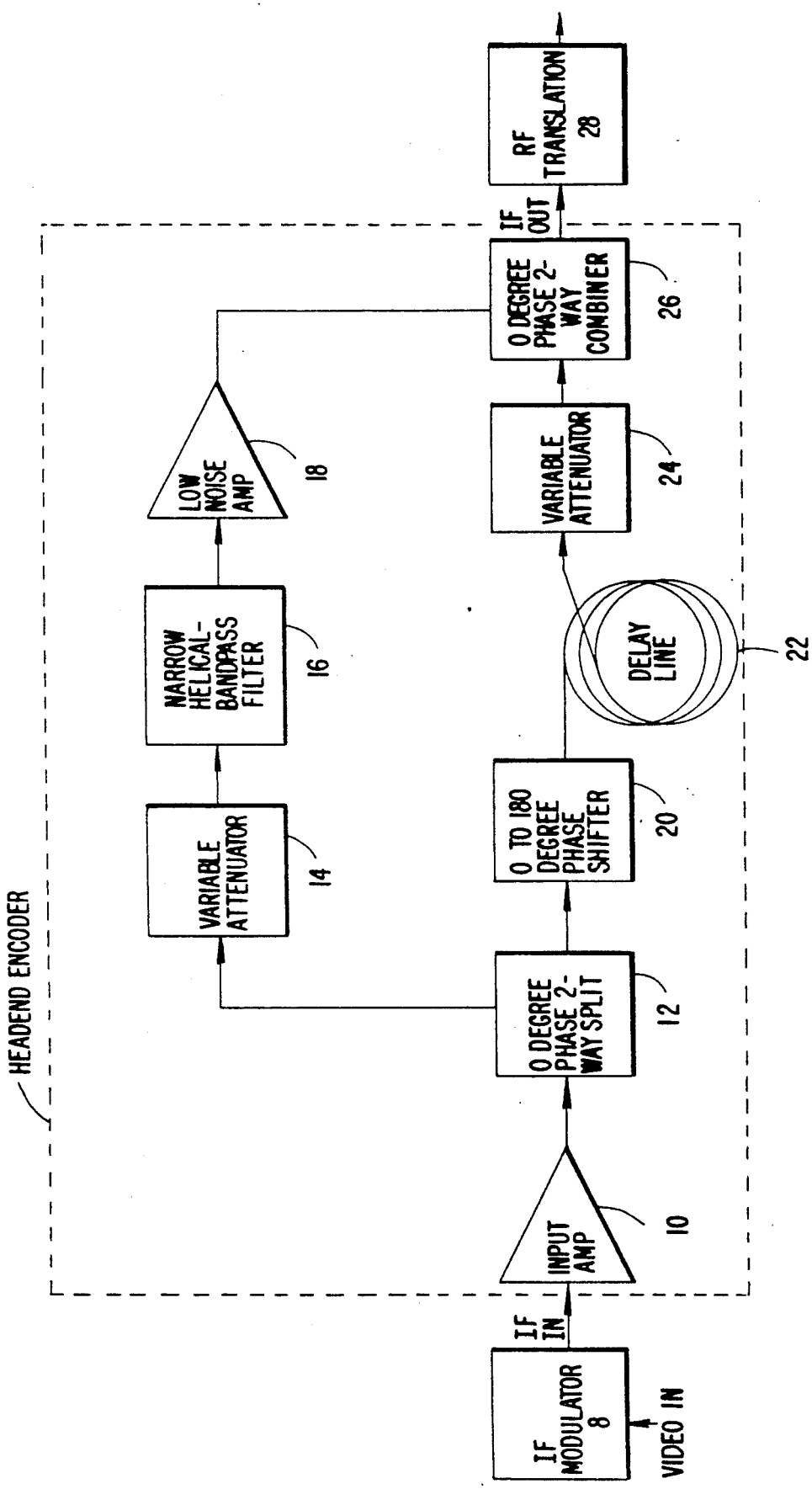
FIG. 1 is a block diagram of a headend encoder of a sideband interdiction system for securing a television transmission signal at a transmission site in accordance with the invention.

A schematic block diagram of the SIS headend encoder is illustrated in FIG. 1 and includes an input amplifier 10 having an input line that is coupled to the IF output of the transmission site's IF modulator stage 8, a 0-degree phase 2-way splitter 12 coupled to the output line of the input amplifier 10, a first variable attenuator 14 and a phase shifter 20 coupled to the 2-way splitter 12, a narrow helical-bandpass filter 16 coupled to the output line of the variable attenuator 14, an amplifier 18 coupled to the output line of the helical-bandpass filter 16, a delay line 22 coupled to the output line of the phase shifter 20, a second variable attenuator 24 coupled to the output line of the delay line 22, and a 0-degree 2-way combiner coupled to the amplifier 18 and the second variable attenuator 24.

During operation, the input amplifier 10 is used to amplify the IF signal supplied from the IF modulator stage 8, which generates the IF signal in response to an input video signal, to compensate for losses that incur as the IF signal is processed by the headend encoder. The 2-way splitter 12 splits the amplified signal that is supplied from the input amplifier 10 into first and second signals of equal phase and amplitude. The first signal is used to generate an enhanced sideband characteristic signal which is then recombined with the second signal to form the encoded IF output signal for the headend encoder.

More specifically, the first signal is supplied to the first variable attenuator 14 which is used to control the amplitude of the enhanced sideband characteristic. The output signal from the first variable attenuator is supplied to the helical-bandpass filter 16. The helical-bandpass filter 16 selectively passes a predefined portion, preferably a narrow band centered at a frequency from 43.2 MHz to 44 MHz and most preferably at 43.2 MHz, of the output signal received from the first variable attenuator 16 to the amplifier 18. The amplifier 18 is provided to compensate for signal loss caused by the helical-bandpass filter 16. The output signal from the amplifier 18 constitutes the enhanced sideband characteristic signal.

Figure 2:
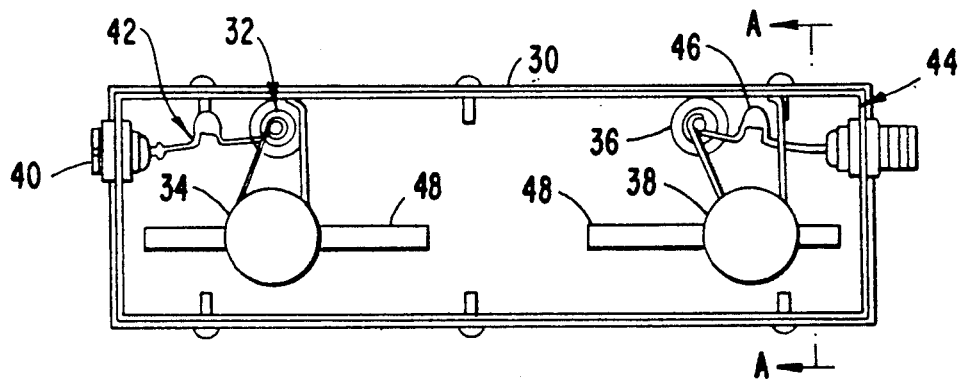
FIG. 2 is a top view of a preferred implementation of a helical-bandpass filter incorporated in the headend encoder illustrated in FIG. 1.
Figure 3:
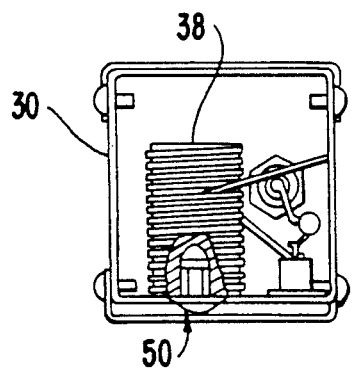
FIG. 3 is a cross-sectional side view of the helical-bandpass filter illustrated in FIG. 2 taken along line A—A.
Figure 4:
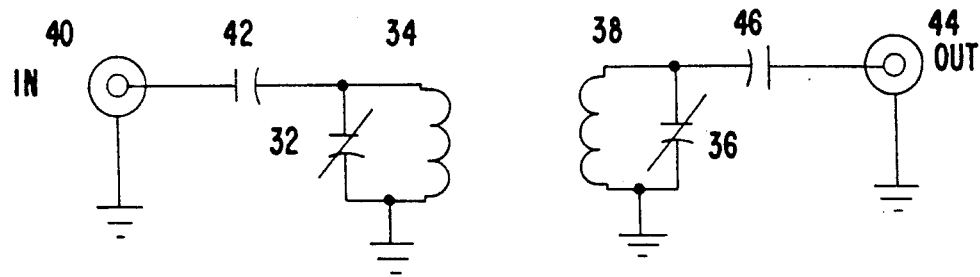
FIG. 4 is a basic schematic diagram of the helical-bandpass filter illustrated in FIG. 2.

The helical-bandpass filter 16 preferably includes a resonant cavity 30, shown in FIG. 2 with top removed, containing a first resonant network including a first variable capacitor 32 coupled to a first inductor 34 and a second resonant network including a second variable capacitor 36 coupled to a second inductor 38. The first resonant network is coupled to an input connector 40 via a first coupling capacitor 42 and the second resonant network is coupled to an output connector 44 via a second coupling capacitor 46. The first and second inductors 34 and 38 are wound on nylon cores in a helical fashion, and are attached to the cavity 30 by screws 50 (or similar adjustable fasteners) that extend into the nylon cores through slots 48 located in a wall of the cavity 30. The frequency response of the helical-bandpass filter 16 is adjusted by varying the capacitance values of variable capacitors 32 and 36. The shape of the overall response of the helical-bandpass filter 16 is adjusted by varying the relative position of the first and second inductors 34 and 38 along the slots 48. A basic schematic diagram of the helical-bandpass filter 16 is shown in FIG. 4.

The second signal produced by the 2-way splitter 12 is supplied to the phase shifter 20. The phase shifter 20 is used to shift the phase of the second signal to compensate for corresponding phase-shifts that are induced in the first signal as it is processed through the variable attenuator 14, the helical-bandpass filter 16 and the amplifier 18, i.e., the enhanced characteristic signal generation path. The output signal from the phase shifter 20 is supplied to the delay line 22 which is provided to delay the second signal for a time period that corresponds to the delay associated with passing the first signal through the enhanced characteristic signal generation path. The output signal from the delay line 22 is supplied to the second variable attenuator 24 so that the amplitude of the second signal can be adjusted to correspond to changes in amplitude in the first signal as it is processed. The processing of the second signal in this manner insures that the second signal can be properly combined with the enhanced sideband characteristic signal supplied from the output of the amplifier 18 by the 2-way combiner 26. The resulting combined signal, which constitutes the encoded IF output signal of the headend encoder, is therefore a combination of the original IF input signal supplied from the transmitter site's IF modulator stage 8 and the enhanced sideband characteristic signal, and has an enhanced sideband content with one major phase shift occurring at the peak of resonance of the helical-bandpass filter 16. The encoded IF output signal is further processed by an RF translation stage 28 of the transmitter site's modulator and subsequent conventional amplifiers, mixers, etc. to generate an encoded television transmission signal.

Figure 8:
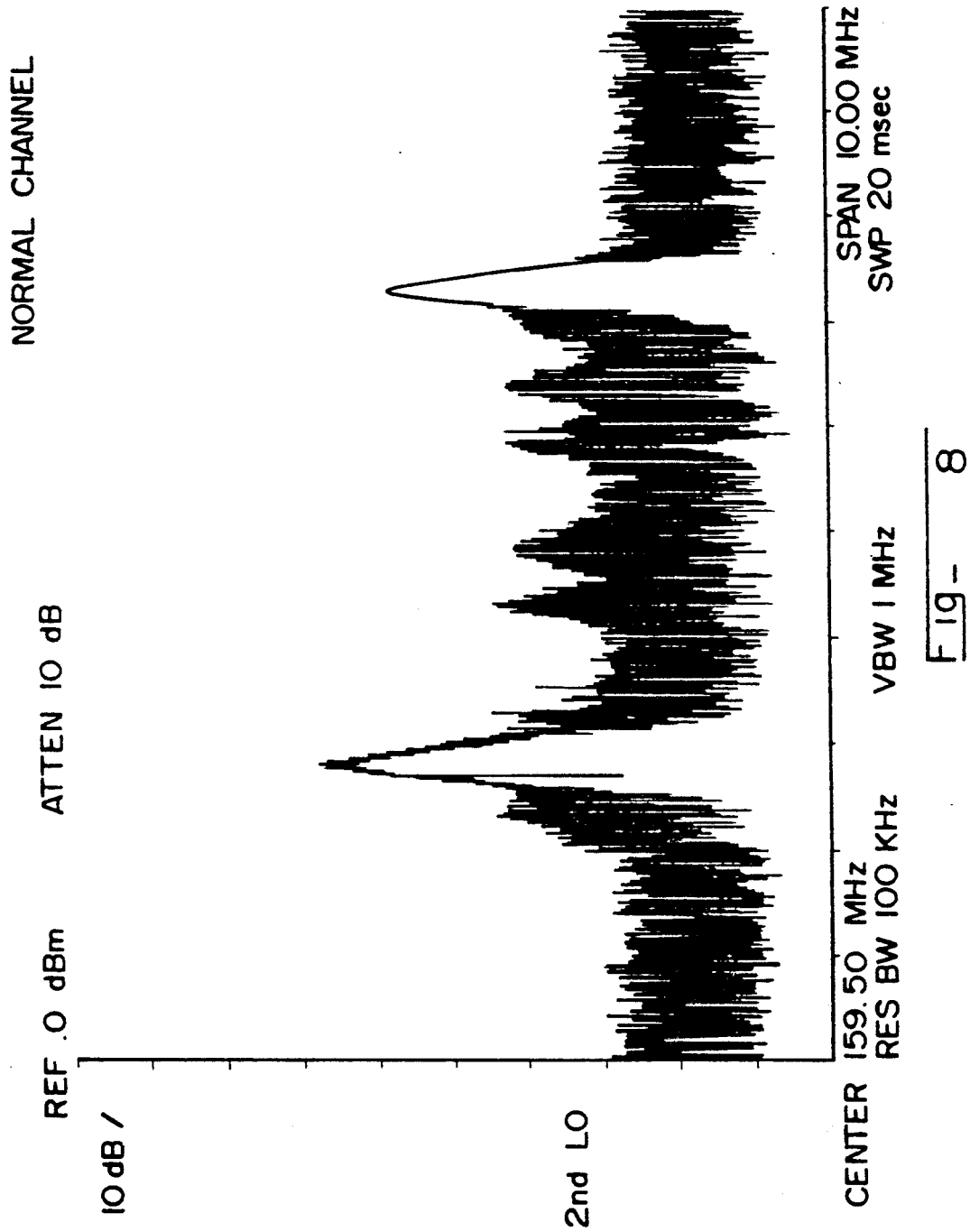
FIG. 8 is a spectrum analyzer presentation of a video and audio carrier modulated with a multiburst pattern showing normal sideband levels.
Figure 9:
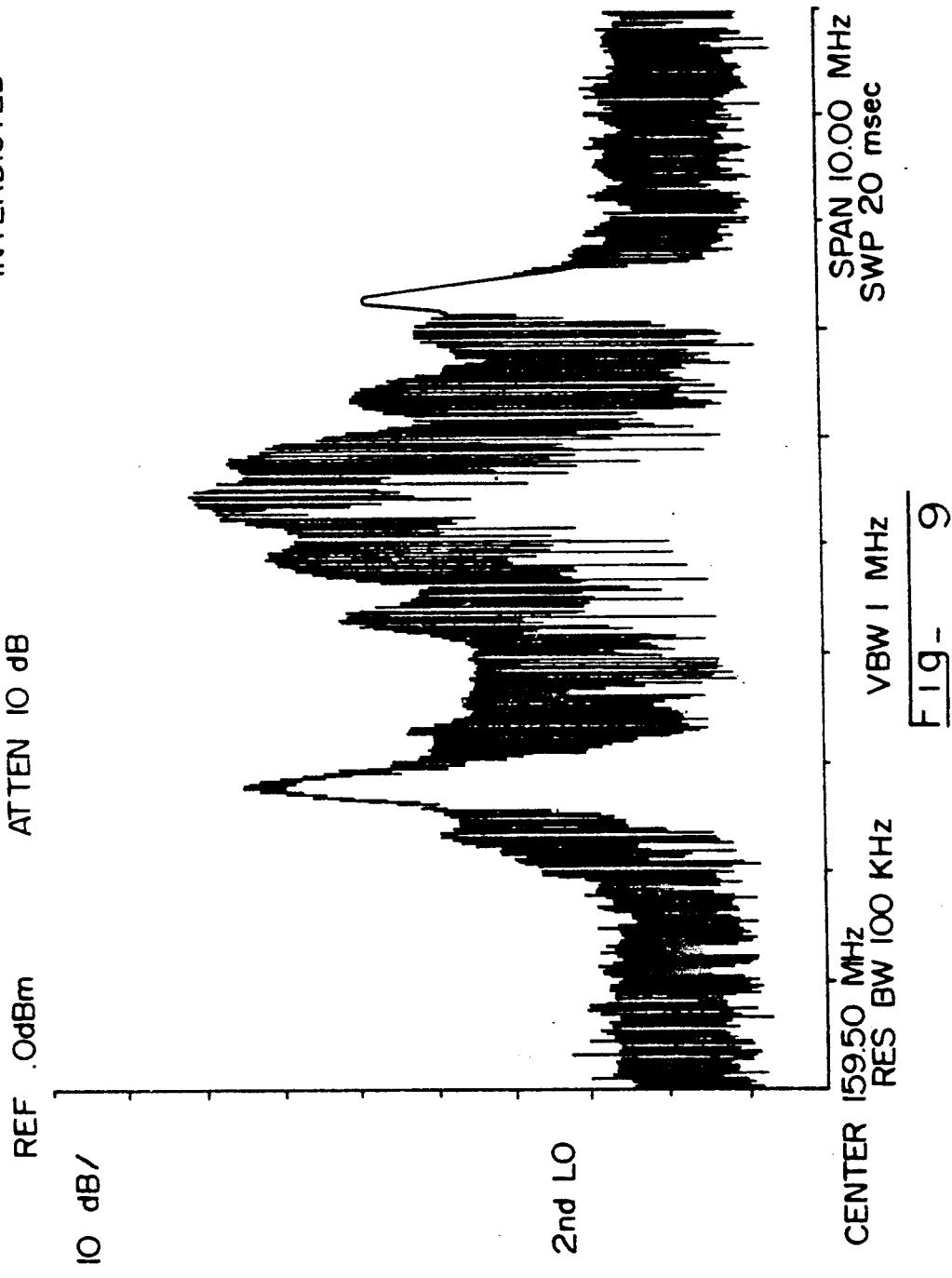
FIG. 9 is a spectrum analyzer presentation of a signal encoded by the encoder illustrated in FIG. 1.

The effect of the enhanced sideband is illustrated by comparing FIGS. 8 and 9. FIG. 8 is a spectrum analyzer presentation of the visual and aural carriers of a television transmission signal modulated with a multiburst pattern showing normal sideband levels. FIG. 9 is a spectrum analyzer presentation of such a signal encoded by the headend encoder illustrated in FIG. 1. The enhanced sideband of the encoded signal adversely impacts the operation of a normal television receiver, for example by causing interference with AFC, AGC and demodulation processes, thereby rendering the received encoded signal unviewable and typically inaudible, e.g., the degree of audio impairment is a function of the sideband energy available in the enhanced sideband region. More specifically, the amplitude level of the enhanced sideband causes the receiver's demodulator to lock on the enhanced sideband instead of the video carrier causing a loss of visual and aural reception of the encoded channel. The enhanced sideband preferably has an amplitude level slightly greater than to 6 dB above that of the visual carrier signal, although higher or lower amplitude levels may also be employed.

Figure 5:
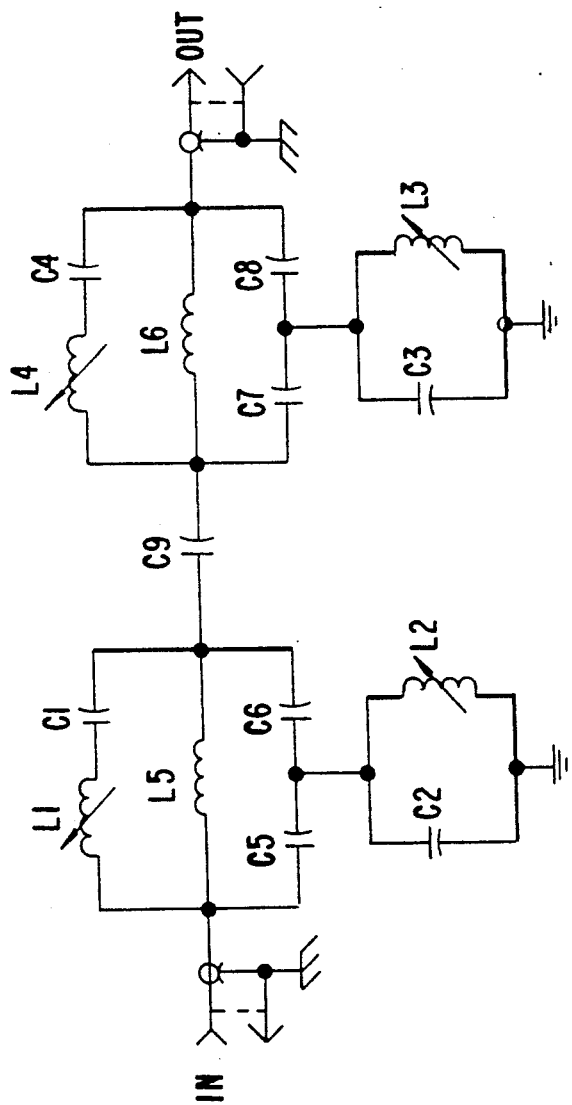
FIG. 5 is a schematic diagram of a decoder for decoding the secured television transmission signal generated by the headend encoder illustrated in FIG. 1.

FIG. 5 illustrates a SIS decoder that can be utilized to decode a television transmission signal encoded by the SIS encoder illustrated in FIG. 1. The decoder includes four resonant poles; the first resonant pole is formed by inductors L1 and L5 and capacitor C1; the second resonant pole is formed by inductor L2 and capacitors C2, C5 and C6, the third resonant pole is formed by inductors L4 and L6 and capacitor C4, and the fourth resonant pole is formed by inductor L3 and capacitors C3, C7 and C8. A blocking capacitor C9 is employed to prevent current from flowing from the input connector IN to the output connector OUT.

Figure 6:
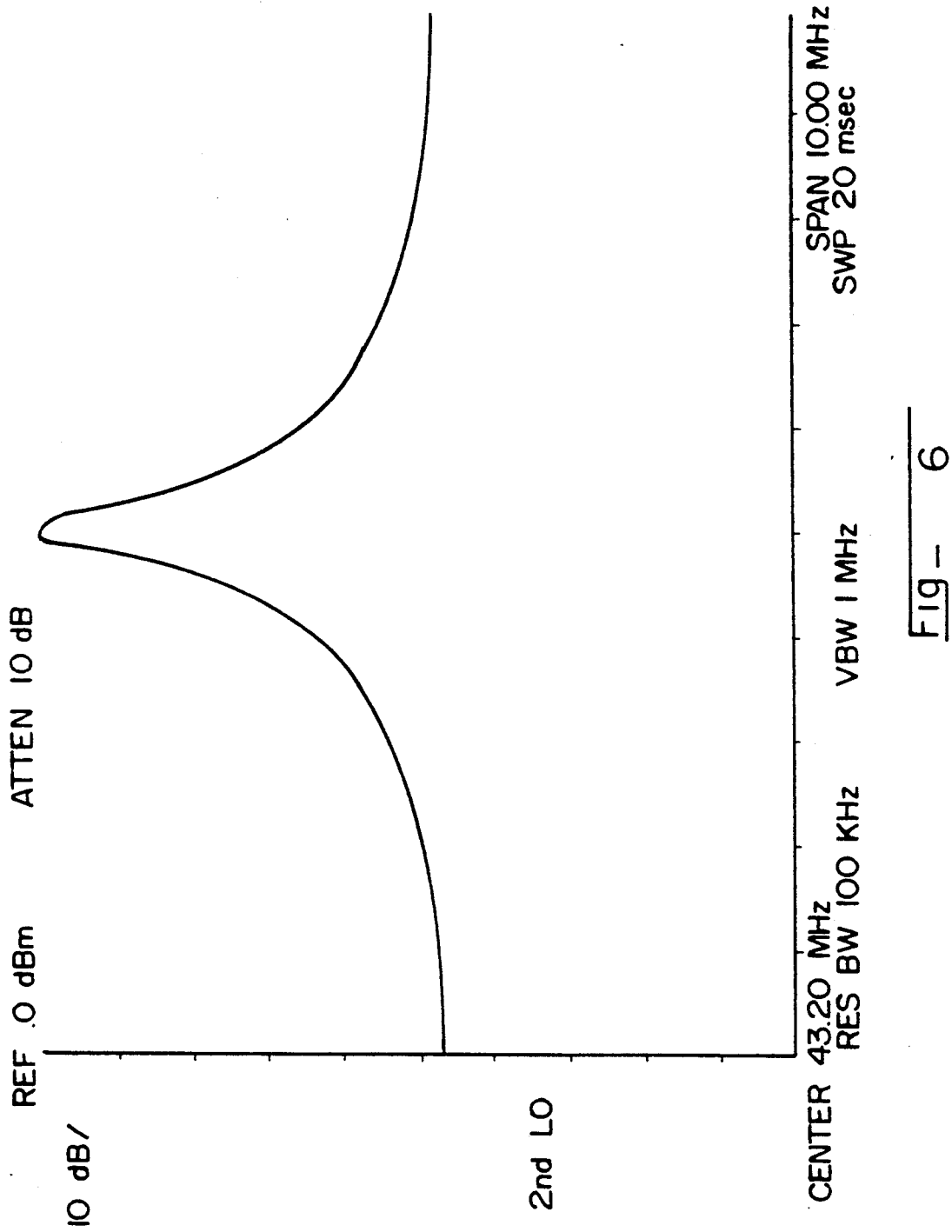
FIG. 6 is a plot of the amplitude versus frequency response of the headend encoder illustrated in FIG. 1.
Figure 7:
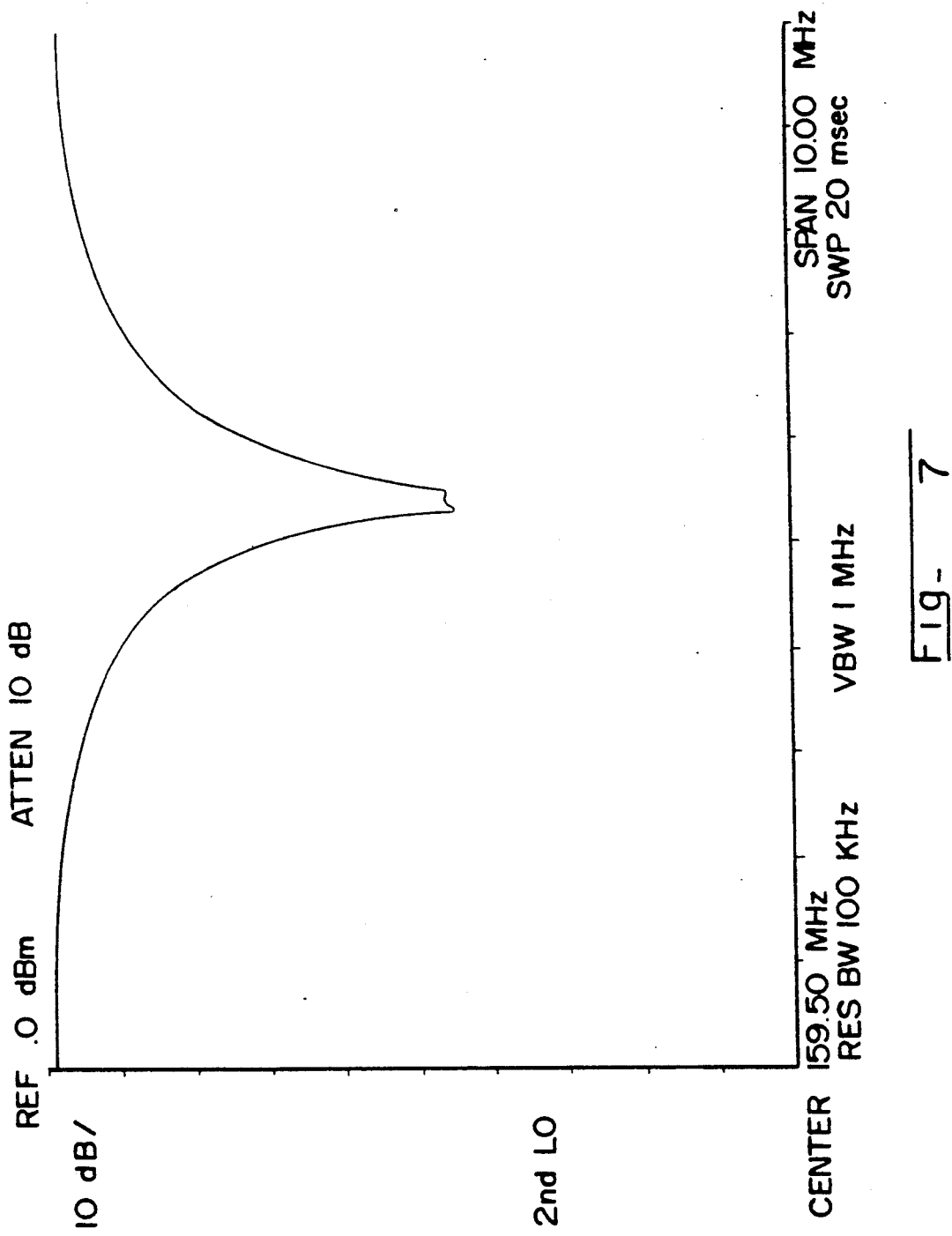
FIG. 7 is a plot of the amplitude versus frequency response of the decoder illustrated in FIG. 2.
Figure 10:
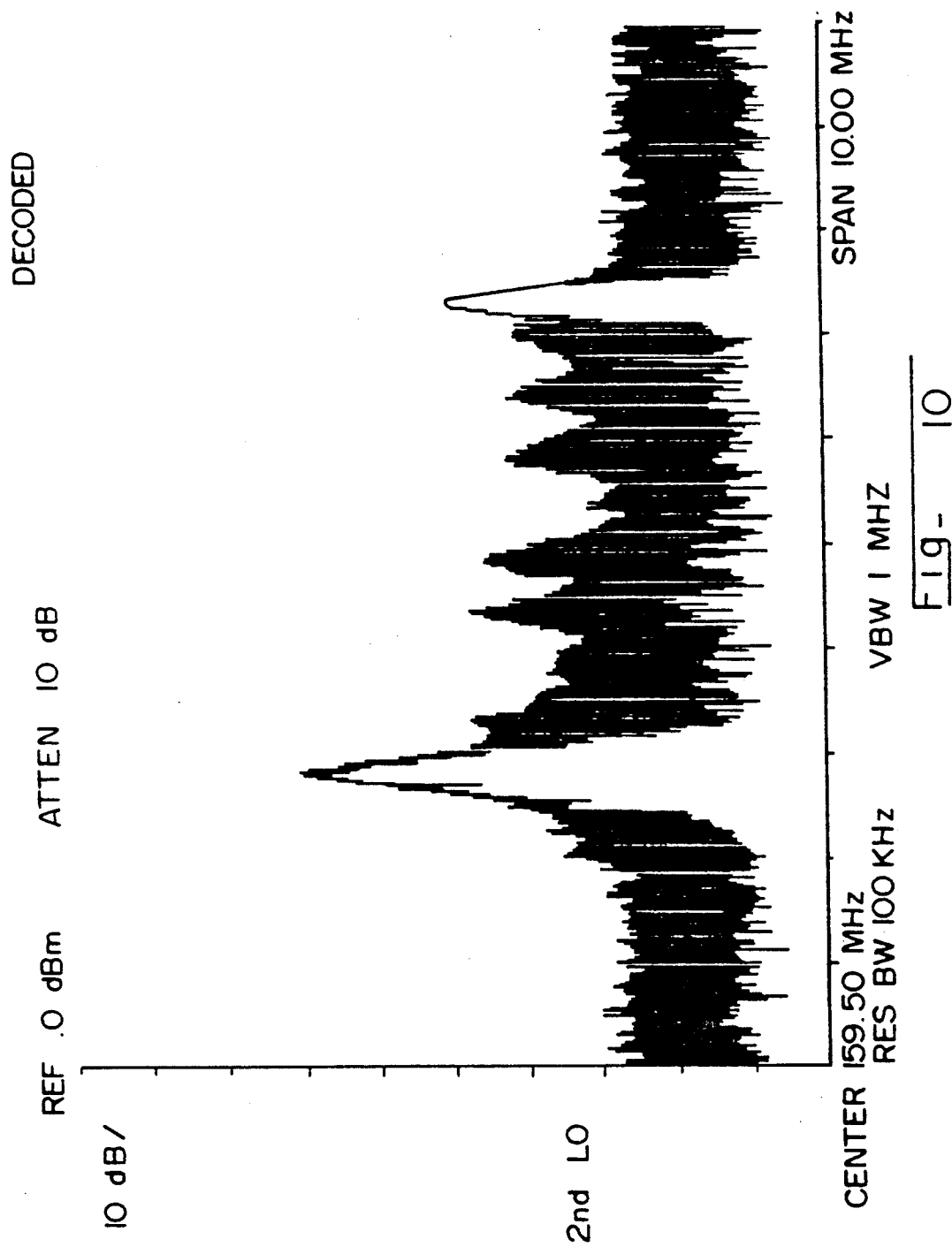
FIG. 10 is a spectrum analyzer presentation of the signal illustrated in FIG. 9 after it has been passed through the decoder illustrated in FIG. 5.

In operation, the entire RF spectrum of the encoded television transmission signal enters the decoder at the connector labelled IN. As is illustrated by FIGS. 6 and 7, the resonant poles are tuned such that the amplitude and phase response is inverse to the amplitude and phase response of the enhanced sideband characteristic signal generated by the encoder shown in FIG. 1. Thus, as shown in FIG. 10, the decoder counteracts the effects of the enhanced sideband characteristic signal and the sidebands are returned to their normal amplitude and phase, i.e. the amplitude and phase associated with an non-encoded signal and representative of the original video input signal to be transmitted, thereby allowing the received signal to be viewed and heard. It should be noted that some minor attenuation of the decoded signal will occur due to losses in the decoder.

The invention is applicable to any type of television or video system that utilizes a signal distribution network, either hard-wired or RF, to deliver one or more television channels to a plurality of receivers, wherein it is desirable to secure one or more channels from unauthorized reception. The invention is also applicable to any standard broadcast format including NTSC, PAL and SECAM. The invention is particularly suited to securing one or more channels of conventional CATV systems.

The invention has been described with reference to certain preferred embodiments thereof. It will be understood, however, that modifications and variations can be made within the scope of the appended claims. For example, although the helical-bandpass filter 16 preferably operates between 43.2–44 MHz, it can be operated at any frequency between the IF signal's visual carrier and aural carrier. Operation outside of the preferred range, however, results in attenuation of the decoded visual and aural carrier that is above generally acceptable levels. The helical-bandpass filter 16 can also be operated at frequency levels above the IF signal's visual carrier to effect the sideband content of the encoded television transmission signal that is between the visual carrier of the encoded television transmission signal and the aural carrier of an adjacent channel. Operation in this range, however, would adversely effect the aural carrier of the adjacent channel, and should therefore be limited to systems in which the adjacent channel is not utilized, i.e., systems in which active channel frequencies are sufficiently spaced to avoid interferences. The structure of the decoder may also vary as long as it provides the function of counteracting the effects of the sideband enhancement characteristic signal. Finally, although the invention has been described in the context of encoding television transmission signals, it is also applicable to any broadband amplitude modulated signal.

What is claimed is:

1. An apparatus for securing a signal from unauthorized reception, the apparatus comprising:
splitting means for splitting an IF signal generated by a transmitter modulator into first and second signals having identical phase;
sideband enhancement means for processing said first signal in order to generate a sideband enhancement characteristic signal;
compensation means for processing said second signal in order to provide phase and amplitude compensation shifts in said second signal that correspond to phase and amplitude shifts that occur in said first signal during the processing of said first signal by said sideband enhancement means; and
combining means for combining said sideband enhancement characteristic signal generated by said sideband enhancement means and said second signal to form an encoded IF signal after said second signal has been processed by said compensation means.

2. The apparatus claimed in claim 1, wherein said sideband enhancement means comprises a variable attenuator, a helical-bandpass filter coupled to said variable attenuator and an amplifier coupled to said helical-bandpass filter.

3. The apparatus claimed in claim 1, wherein said compensation means includes a phase shift unit, a delay line coupled to said phase shift unit and a variable attenuator coupled to said delay line.

4. The apparatus as claimed in claim 1, wherein said helical-bandpass filter comprises a resonant cavity containing a first resonant network and a second resonant network.

5. The apparatus as claimed in claim 4, wherein said first resonant network includes a first variable capacitor coupled to a first inductor and said second resonant network includes a second variable capacitor coupled to a second inductor, and wherein said first resonant network is coupled to an input connector of said resonant cavity via a first coupling capacitor and said second resonant network is coupled to an output connector of said resonant cavity via a second coupling capacitor.

6. The apparatus as claimed in claim 5, wherein said first and second inductors are wound on nylon cores in a helical fashion and are attached to said resonant cavity by adjustable fasteners that extend into the nylon cores through slots located in a wall of said resonant cavity.

7. The apparatus claimed in claim 1, further comprising processing means for processing said encoded IF signal into an RF encoded television transmission signal, wherein said RF encoded television transmission signal includes enhanced sideband characteristics.

8. The apparatus claimed in claim 7, wherein said enhanced sideband characteristics include a sideband amplitude level that is near to or greater than the visual carrier signal amplitude level of said RF encoded television transmission signal.

9. The apparatus claimed in claim 8, further comprising decoding means for removing said enhanced sideband characteristics from said RF encoded television transmission signal.

10. The apparatus claimed in claim 9, wherein said decoding means comprises inductors and capacitors coupled to form a plurality of resonant poles.

11. An apparatus for decoding an encoded signal having enhanced sideband characteristics, said apparatus comprising: amplitude adjustment means for adjusting sideband amplitude levels of said encoded signal and phase compensation means for compensating for sideband phase shifts in said encoded signal.

12. The apparatus as claimed in claim 11, wherein said amplitude adjustment means and said phase compensation means comprise inductors and capacitors coupled to form a plurality of resonant poles.

13. A method for securing a signal from unauthorized reception, said method comprising the steps of:
splitting an IF signal generated by a transmitter modulator into first and second signals having identical phase with a splitting unit;
enhancement processing said first signal with a sideband enhancement unit to generate a sideband enhancement characteristic signal;
compensation processing said second signal with a compensation unit to provide phase and amplitude compensation shifts in said second signal that correspond to phase and amplitude shifts that occur in said first signal during the processing of said first signal by said sideband enhancement unit; and
combining said sideband enhancement characteristic signal generated by said sideband enhancement unit and said second signal to form an encoded IF signal after said second signal has been processed by said compensation unit with a combining unit.

14. The method of as claimed in claim 13, wherein said enhancement processing comprises varying the attenuation of said first signal with a variable attenuator, passing selected portions of said first signal with a helical-bandpass filter that is coupled to said variable attenuator, and amplifying the passed portions of said first signal with an amplifier coupled to said helical-bandpass filter.

15. The method as claimed in claim 14, wherein said compensation processing includes phase shifting said second signal with a phase shift unit, delaying said second signal with a delay line coupled to the phase shift unit, and adjusting the attenuation of said second signal with a variable attenuator coupled to the delay line.

16. The method as claimed in claim 15, further comprising the step of processing said encoded IF signal to form an RF encoded television transmission signal, wherein said encoded television transmission signal has enhanced sideband characteristics.

17. The method as claimed in claim 16, further comprising the step of removing said enhanced sideband characteristics from said encoded television transmission signal.

18. The method as claimed in claim 17, wherein said removing step includes the steps of correcting the sideband amplitude level and sideband phase characteristic of said encoded television transmission signal.

19. The method as claimed in claim 14, wherein said helical-bandpass filter passes a narrow band centered at a frequency between 43.2 MHz and 44 MHz.

20. The method as claimed in claim 14, wherein said helical-bandpass filter passes a narrow band centered at a frequency of 43.2 MHz.

21. The apparatus claimed in claim 2, wherein said helical-bandpass filter passes a narrow band centered at a frequency between 43.2 MHz and 44 MHz.

22. The apparatus claimed in claim 2, wherein said helical-bandpass filter passes a narrow band centered at a frequency of 43.2 MHz.

* * * * *